United States Patent
Craig

(10) Patent No.: US 7,925,264 B2
(45) Date of Patent: Apr. 12, 2011

(54) METHOD AND ARRANGEMENT FOR IMPROVED HANDOVER BY MUTING INTERFERING NODES

(75) Inventor: Stephen Craig, Nacka (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 865 days.

(21) Appl. No.: 11/795,412

(22) PCT Filed: Mar. 14, 2005

(86) PCT No.: PCT/SE2005/000365
§ 371 (c)(1),
(2), (4) Date: Jul. 17, 2007

(87) PCT Pub. No.: WO2006/098665
PCT Pub. Date: Sep. 21, 2006

(65) Prior Publication Data
US 2008/0125124 A1    May 29, 2008

(51) Int. Cl.
*H04W 36/00* (2009.01)
*H04W 4/00* (2009.01)
(52) U.S. Cl. ......... 455/439; 455/437; 455/438; 370/331
(58) Field of Classification Search .... 455/1, 63.1–63.4, 455/114.2, 115.1, 194.1–194.2, 278.1, 296, 455/418–420, 436–444, 67.11, 67.13, 171.1, 455/174.1, 218, 220, 226.1–226.3, 422.1, 455/423–425, 434, 513, 517, 524–525, 550.1, 455/552.1, 556.2, 560–561; 370/331–334, 370/328, 338; 381/94.1–94.5
See application file for complete search history.

(56) References Cited

U.S. PATENT DOCUMENTS

| | | | |
|---|---|---|---|
| 5,239,557 A * | 8/1993 | Dent ........................ | 375/1 |
| 5,239,675 A | 8/1993 | Dudczak | |
| 6,560,210 B1 | 5/2003 | Matusevich | |
| 6,721,409 B1 | 4/2004 | Dell et al. | |
| 6,748,212 B2 * | 6/2004 | Schmutz et al. ............. | 455/424 |
| 7,006,828 B1 * | 2/2006 | Czaja et al. ................ | 455/442 |
| 2002/0032030 A1 * | 3/2002 | Berglund et al. ............ | 455/434 |
| 2004/0203806 A1 | 10/2004 | Craig et al. | |

FOREIGN PATENT DOCUMENTS

| | | |
|---|---|---|
| EP | 0 964 599 A2 | 12/1999 |
| JP | 2000-032533 | 1/2000 |
| JP | 2003 259414 | 9/2003 |
| WO | WO 01/97537 A2 | 12/2001 |
| WO | WO 2006/098665 | 9/2006 |

OTHER PUBLICATIONS

Malaysian Substantive Examination Adverse Report and Substantive Examination Examiner's Report mailed Feb. 27, 2009 in corresponding Malaysian Application No. PI 20060347. Malaysian Search Report mailed Feb. 27, 2009 in corresponding Malaysian Application No. PI 20060347.
International Search Report for PCT/SE2005/000365 mailed Nov. 2, 2005.
Masaharu Hata; "Empirical Formula for Propagation Loss in Land Mobile Radio Services"; IEEE, Aug. 1980, vol. VT-29, No. 3; pp. 317-325.
Summary of Japanese official action, Aug. 27, 2010, in corresponding Japanese Application No. 2008-501833.

* cited by examiner

*Primary Examiner* — Meless N Zewdu
(74) *Attorney, Agent, or Firm* — Nixon & Vanderhye P.C.

(57) ABSTRACT

In a telecommunication system, a method for improved handover signaling includes temporarily enhancing the radio environment of a user engaged in handover signaling by muting one or more dominant interfering cells during the signaling process, and coordinating the muting with the actual handover signaling.

30 Claims, 10 Drawing Sheets

METHOD AND ARRANGEMENT FOR IMPROVED HANDOVER BY MUTING INTERFERING NODES

This application is the US national phase of international application PCT/SE2005/000365 filed 14 Mar. 2005, which designated the U.S., the entire content of which is hereby incorporated by reference.

TECHNICAL FIELD

The technology described herein relates to communication systems in general, specifically to methods and arrangements for improved handover in such systems.

BACKGROUND

The ability to manage user mobility without service interruption is a fundamental requirement in cellular networks. Particularly sensitive is the so-called handover or handoff procedure in which a user's communication link(s) is transferred from one (or more) base station(s) to one (or more) other base station(s) in the middle of an active session. The purpose of the handover procedure is to preserve ongoing calls or sessions, when moving from one cell to another.

The handover process can be "soft", in which case an active set of multiple base stations maintains simultaneous connections with a given user and base stations are added and removed from the active set as radio conditions change, or "hard", in which case a single serving base station passes on a connection in its entirety to another serving base station.

The decision whether to perform handover or active set update is usually made by a network node such as the base station controller in GSM, or the radio network controller in WCDMA. As a basis for this decision, the node receives information about the radio link quality from the base stations and mobile units under its control. During a call, the mobile unit sends measurement results to the base station or base stations with which it is communicating, either periodically, or when requested to do so by the network, or whenever some other pre-defined criterion is fulfilled. The measurement results typically contain measurements of the radio signal strength and quality of the downlink (from the base station(s) to the mobile unit) of the call, as well as the signal strengths of a number of neighboring base stations, e.g. six neighboring base stations in GSM. The serving base station or base stations measure the uplink (from the mobile unit to the base station(s)) radio signal strength and quality of the call and forward these measurement results, together with those from the mobile unit, in a measurement report to the aforementioned node that is responsible for handover and active set update decisions. From the information in the measurement reports, the node is then able to decide whether a handover to another cell or an active set update is needed.

A variation on the abovementioned procedure is that the mobile unit itself initiates the handover process based on its own measurement results. This is an option, for example, in GPRS systems.

Irrespective of which node actually makes the decision, handover signaling is necessarily performed at or near the cell borders, far from the serving base station(s) in relatively poor radio conditions. Picking the optimal time to initiate handover or active set update can be difficult in practice due to factors such as cell plan irregularities, neighbor cell measurement constraints, measurement filtering, hysteresis values, and channel management timers. As explained in more detail below, sub-optimal handover behavior can have a strong negative impact on service quality and overall system performance, making it essential that the handover procedure be robust to poor radio conditions.

State-of-the-art cellular networks typically employ a very tight reuse of radio resources to maximize spectral efficiency and simplify network planning. An exemplary method in GSM is Fractional Load Planning (FLP) in which frequencies are reused for traffic in each cell, so-called 1-reuse. Fewer transceivers than there are available frequencies are typically installed in each cell in order to guarantee that only a fraction of these frequencies are in use at any given time irrespective of the amount of traffic, hence the term "fractional loading". Users in an FLP network perform frequency hopping between all the allocated frequencies, but in different patterns in different cells to create strong but sporadic interference. Any bit errors occurring during the times of interference can generally be corrected with the help of channel coding and interleaving, and the resulting spectral efficiency clearly exceeds that of traditionally planned networks with a sparse frequency reuse.

In traditional sparse reuse networks, system performance is relatively insensitive to users being connected to sub-optimal base stations because the interfering cells are typically far away from both the serving cell and its neighboring cells. Mobile units drifting well into a neighboring cell before performing handover do not generally cause a significant increase in interference and the demands on the handover process are therefore lower. In state-of-the-art tight reuse networks, however, interfering cells are close by and being connected to the most appropriate base station is essential if the high spectral efficiency potential is to be achieved. In many cases, the serving cell and its neighbors will be strong interferers and drifting well into a neighboring cell can dramatically increase interference levels, thereby disrupting user services and reducing system capacity. Battery lifetimes are also negatively affected.

Soft handover solutions are generally more robust than those using hard handover, but they involve higher complexity and cost in infrastructure and terminals, and they demand more transmission and air interface resources. In many practical situations, the introduction of soft handover is unfeasible.

Hard handover is easier and cheaper to implement and it utilizes fewer resources, but achieving the requisite robustness can be difficult, particularly in state-of-the-art networks, for the reasons outlined above.

SUMMARY

An object is to enable an improved handover procedure.

A specific object is to temporarily reduce interference experienced by a node, whereby the C/I ratio is temporarily increased.

Another specific object is to temporarily reduce interference during handover signaling.

Another specific object is to enable coordinated muting and handover signaling in a communication system.

These and other objects are achieved in accordance with the attached claims.

Briefly, handover robustness is improved by temporarily enhancing the radio environment of a user engaged in handover signaling. This is achieved by muting one or more dominant interfering cells during part or all of the signaling process, either in all handover cases, or only when some specific conditions are fulfilled, for example, a first handover command did not reach the user, or the user is deemed to be in sufficiently poor radio conditions according to some criteria.

Example advantages include:
A more robust handover procedure;
Increased number of early successful handovers;
Decreased number of lost frames;
Decreased interference;
Improved service quality;
Fewer service interruptions such as dropped calls;
Increased network capacity.

FREQUENTLY USED ABBREVIATIONS

ACK Acknowledgement
AMR Adaptive Multi-Rate speech coder
BCCH Broadcast Control CHannel
BER Bit Error Rate
BLER Block Error Rate
BSC Base Station Controller
BS Base Station
BSIC Base Station Identity Code
C/I Carrier-to-Interference ratio
CS Circuit-Switched
CHAT CHannel Allocation Tiering
FER Frame Erasure Rate
FLP Fractional Load Planning
GSM Global System for Mobile communication
GPRS General Packet Radio Services
L2 Layer 2
L3 Layer 3
MSC Mobile services Switching Center
MU Mobile Unit
OFDM Orthogonal Frequency Division Multiplexing
PS Packet-Switched
RXLEV Measure of received signal strength in GSM
RXQUAL Measure of received quality (bit error rate) in GSM

DETAILED DESCRIPTION

By way of illustration, the technology described herein will be described below primarily in the context of inter-cell handover for circuit-switched (CS) traffic in a Global System for Mobile Communication (GSM) system. However, the use in other types of systems, for example those using Orthogonal Frequency Division Multiplexing (OFDM), or for intra-cell handover, or for packet-switched (PS) traffic utilizing handover or cell reselection, is also conceivable following the same general principles. For the sake of simplicity, all types of cell change during an active session are referred to as "handover" in the text below.

Figure 1:
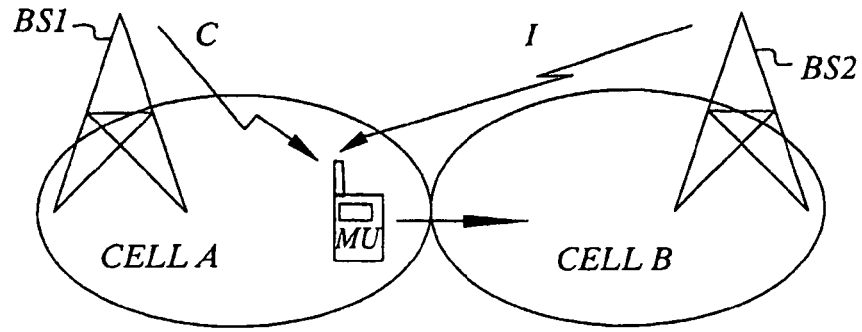
FIG. 1 illustrates a handover situation.

Consider the situation as illustrated in FIG. 1. The system comprises a GSM mobile unit MU communicating with a serving base station BS1 in cell A. Simultaneously, the mobile unit MU is moving, traveling from the cell A of the serving base station BS1 into the cell B of a candidate base station BS2. In the illustrated system the two base stations BS1, BS2 are associated with a common base station controller BSC: However, the technology described herein is equally applicable to situations where the base stations are associated with different base station controllers as well as with different mobile services switching centers (MSC:s).

The mobile unit MU regularly measures, according to prior art, the received signal strength on frequencies used by neighboring base stations in accordance with a neighbor cell list that it receives from the network. During idle time slots, it also attempts to identify neighboring base stations by decoding their Base Station Identity Code (BSIC). A correctly measured BSIC is required together with a received signal strength measurement in order for the measurement to be used in a handover decision. Once received by the network, the measurements are filtered and handover criteria are evaluated in a network node, typically the Base Station Controller (BSC). Such handover criteria may include signal strength hysteresis values to minimize ping-pong handovers as well as other signal strength or timing penalties triggered by previous channel management operations, for example an intra-cell handover.

The process of neighbor cell measurement, identification, reporting, filtering and handover criteria evaluation is performed before any handover command can be sent. It is often carried out in an irregular cell plan with fast-moving users and an inhomogeneous radio environment. For these reasons, handover commands are usually sent to mobile units when they are already in the nominal coverage area of the candidate base station BS2 and moving further away from the serving base station BS1 all the time. With the tight reuse of radio resources typically employed in state-of-the-art networks, the handover process must clearly be executable in poor radio conditions in order to prevent dropping calls.

In accordance with the above reasoning, a handover command will usually be sent to the mobile when it is already in cell B. At this point in a state-of-the-art network with a frequency reuse of one, the base station in cell B is likely to be the dominant source of downlink interference.

According to prior art, one method of improving the robustness for handovers is to temporarily increase the power of a serving base station when a command to perform a handover is transmitted in an attempt to increase the C/I experienced by the mobile unit to which the handover command is directed. However, this method spreads more interference in the network and may not be applicable in many cases since the serving base station is often already transmitting at maximum power before such a handover command is to be transmitted. Moreover, the gains from the method diminish the further into the target cell the mobile unit moves, contrary to the desired behavior of a technique aimed at increasing handover robustness.

Instead, as identified by the inventor, in order to improve the possibility of correct reception of a handover command it could be more efficient to temporarily reduce the interference experienced by the mobile during actual handover signaling.

Briefly, handover robustness is improved by temporarily enhancing the radio environment of a user engaged in handover signaling. This is achieved by muting one or more dominant interfering cells during the signaling process.

Accordingly, handover signaling performance is improved by temporarily muting one or more dominant sources of interference at appropriate times. Basically, the C/I experienced by a mobile performing handover is temporarily increased by reducing interference I rather than increasing carrier strength C, which is the standard prior art approach to improving handover robustness, as used for example in soft handover.

Figure 2:
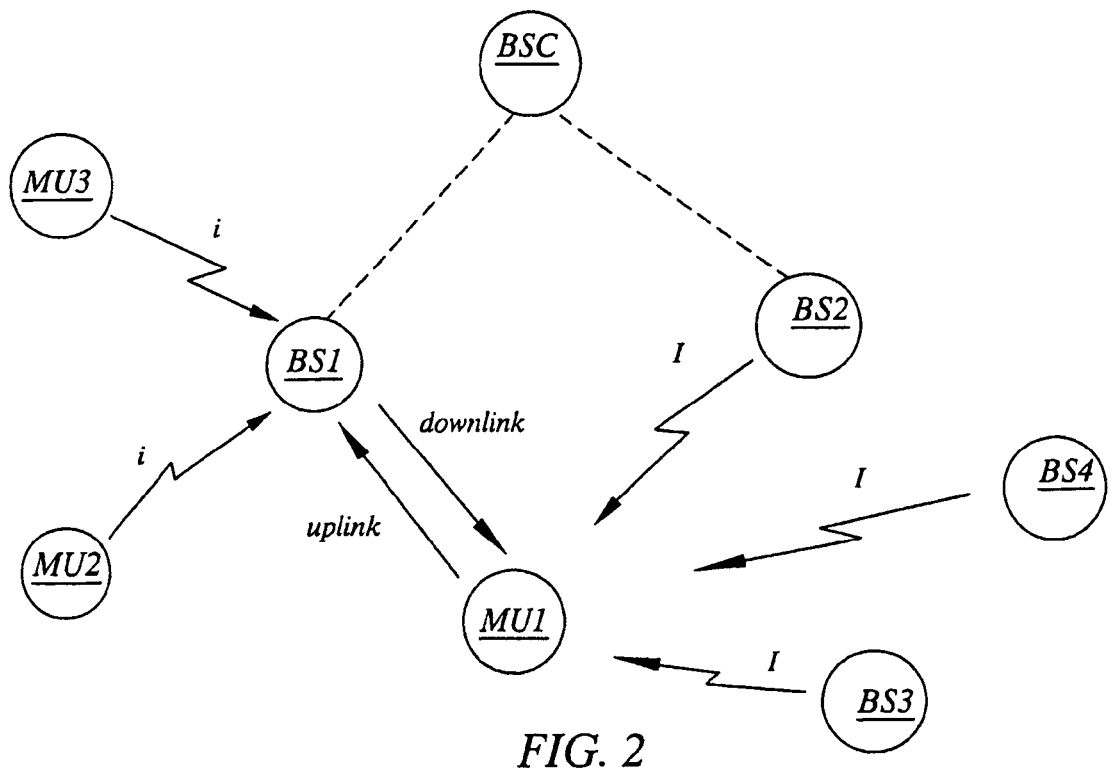
FIG. 2 illustrates an example embodiment.

FIG. 2 represents a general system in which technology described herein can be implemented. The system comprises a user node e.g. mobile unit MU1 communicating with a first node e.g. base station BS1 and experiencing interference I from at least one of a plurality of nodes e.g. base stations BS2, BS3, BS4. The first base station BS1 experiences interference i from at least one of a plurality of other users e.g. mobile units MU2, MU3. For downlink signaling from the first node to the user, the plurality of nodes are the primary sources of interference. For uplink signaling from the user MU1 to the first node, the primary sources of interference i are the plurality of other mobile units. According to FIG. 2 the first and second nodes e.g. base stations BS1, BS2 are associated with a common control node e.g. base station controller BSC. However, the technology described herein is equally applicable to a situation where handover is required between different base station controllers.

Figure 3:
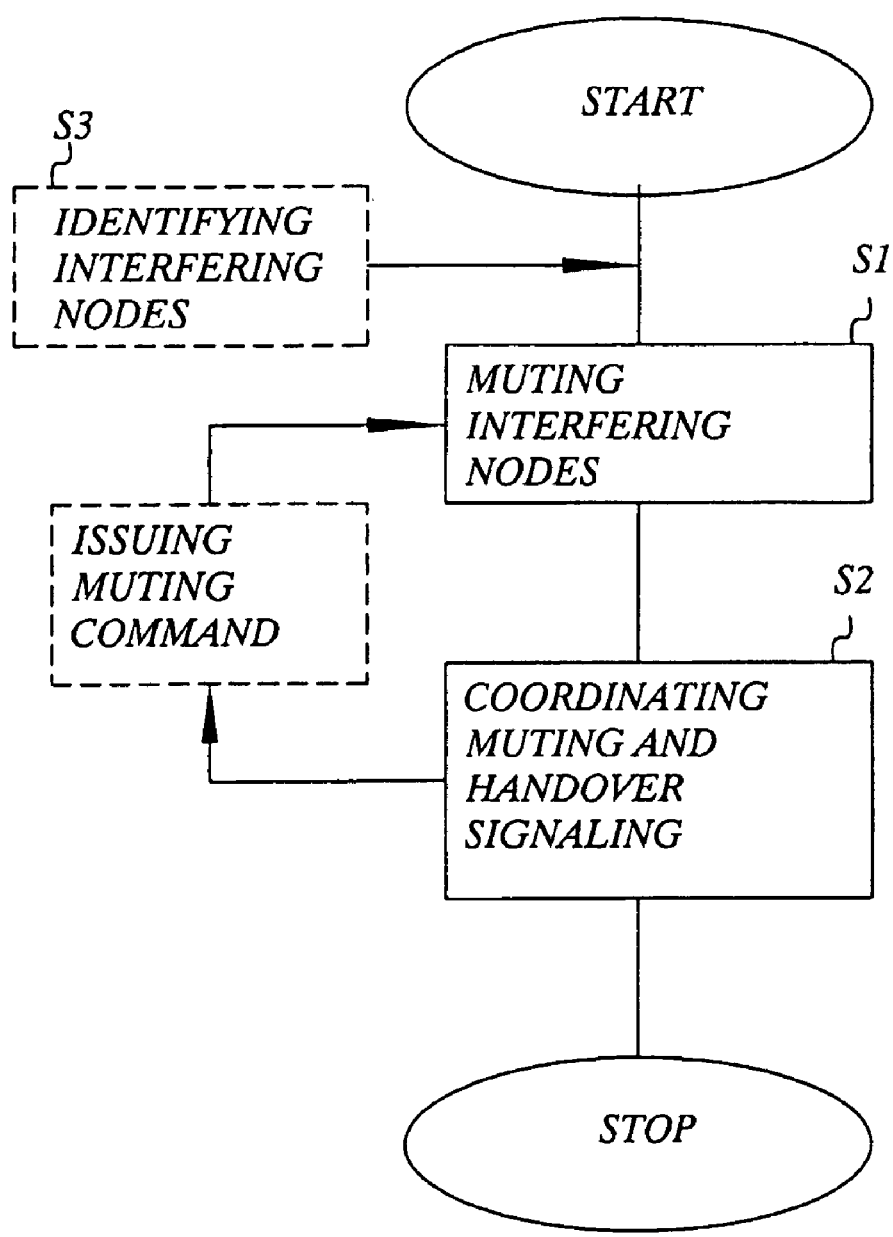
FIG. 3 is a schematic flow diagram of example embodiments of methods.
Figure 4:
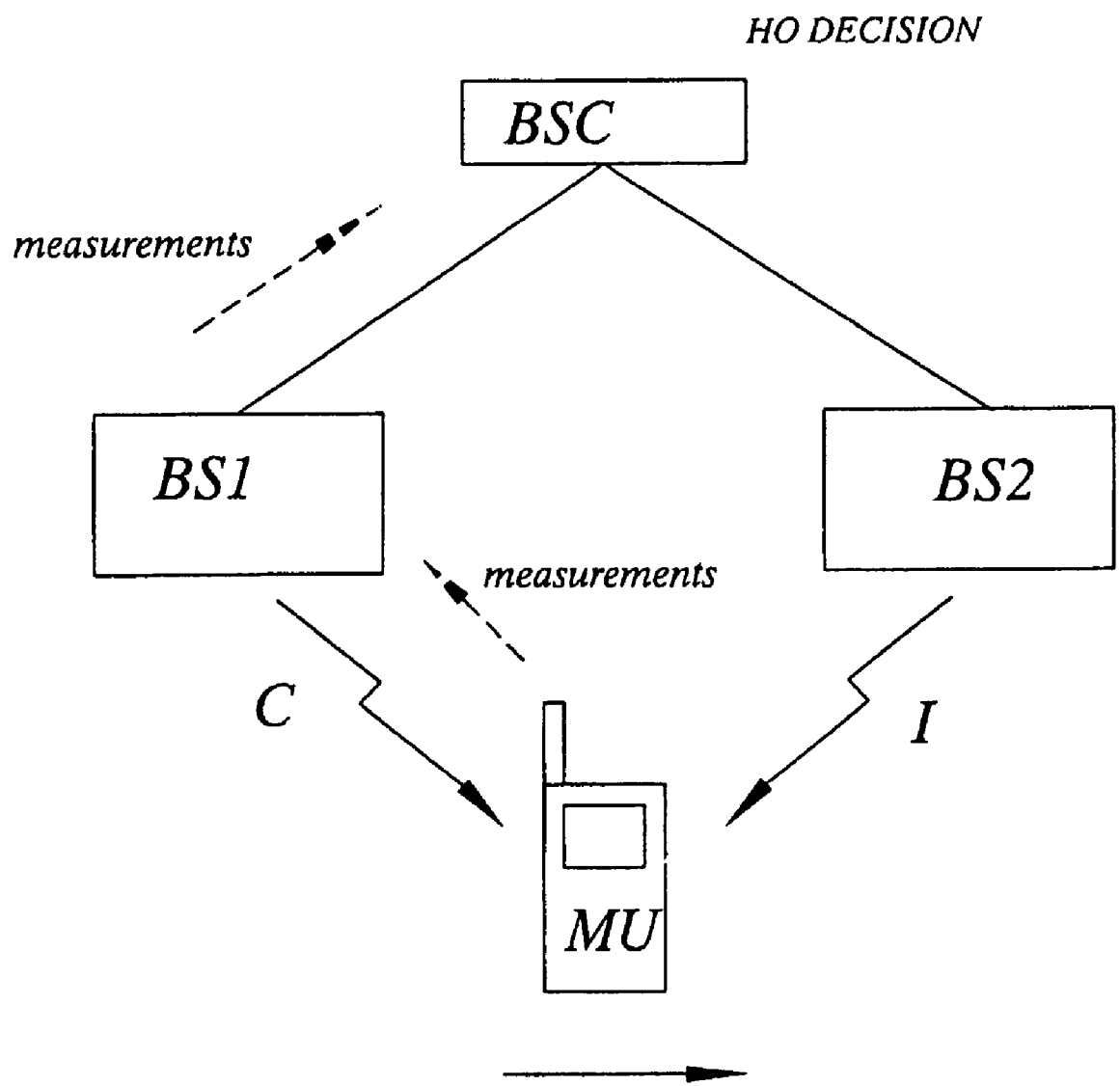
FIGS. 4-7 illustrates the signaling steps in an example embodiment of a method.

Basically, with reference to FIG. 3, an example embodiment of a method comprises muting S1 one or more second nodes interfering with the communication between a first node and a user, and coordinating S2 the muting S1 with handover signaling between the first node and the user.

According to a more specific embodiment, also with reference to FIG. 3, in order to enable muting a logical node issues muting commands to the interfering nodes in such a way as to coordinate the actual muting of the interfering node with the handover signaling.

According to another specific embodiment of a method, the muting step S1 is preceded by an additional step of identifying S3 one or several dominant interfering nodes that need to be muted.

With reference to FIGS. 3-7, a specific example embodiment will be described in the context of downlink handover signaling in a GSM system. Once again, the model system comprises a mobile unit MU moving from a first cell associated with a first base station BS1 into the coverage of a second cell associated with a second base station BS2. The two base stations according to the embodiment are associated with a common base station controller BSC, however the technology described herein is not limited to this case but is equally applicable to the case where the base stations are associated with separate base station controllers.

The mobile unit MU continuously performs measurements of the radio link and the signal strengths of neighboring base stations. The first base station BS1 continuously performs measurements of the radio link and reports these measurements along with those from the mobile unit MU to the base station controller BSC, as indicated by the broken arrows in FIG. 4. At some point in time, the base station controller BSC decides, based on the measurements, that it is necessary to perform handover to the second base station BS2.

Figure 5:
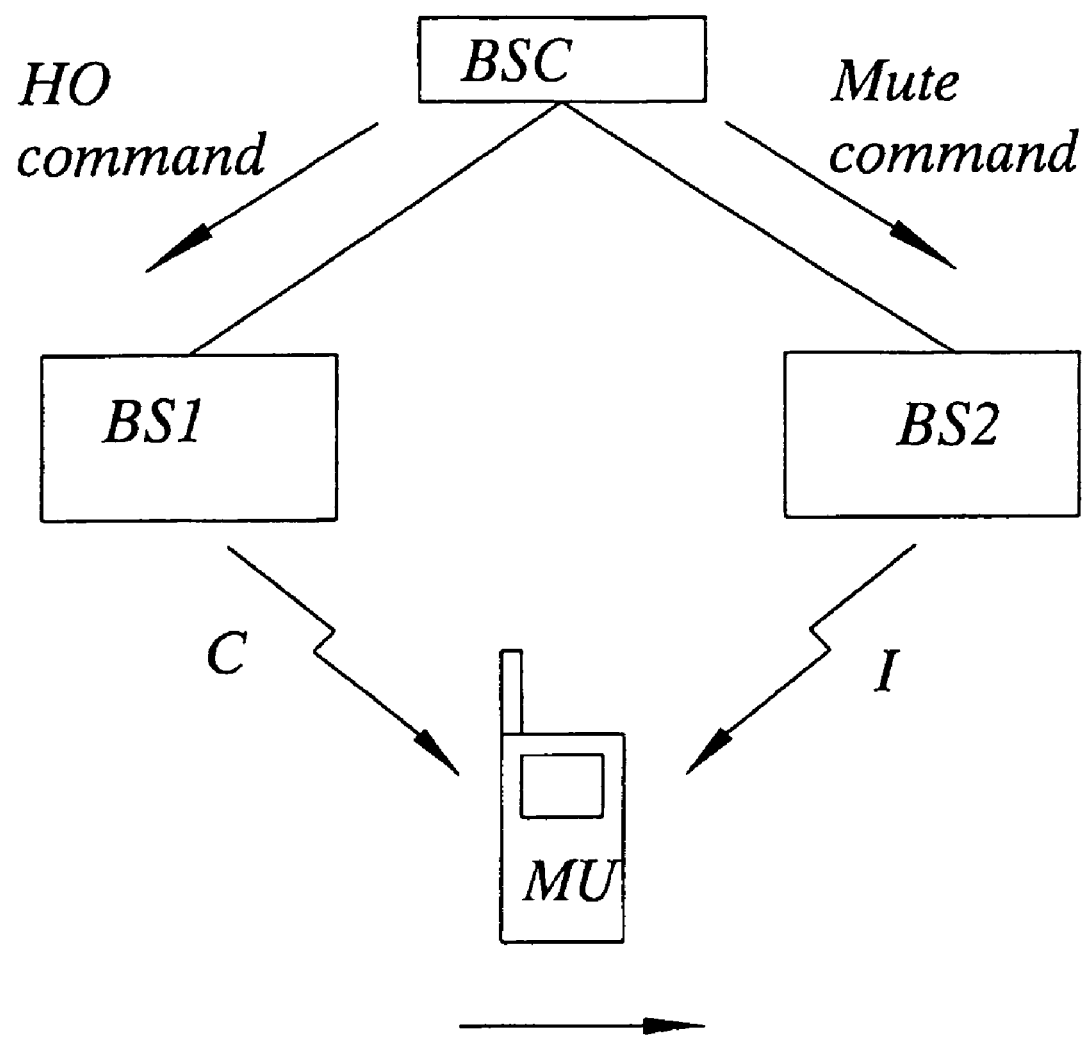
Figure 6:
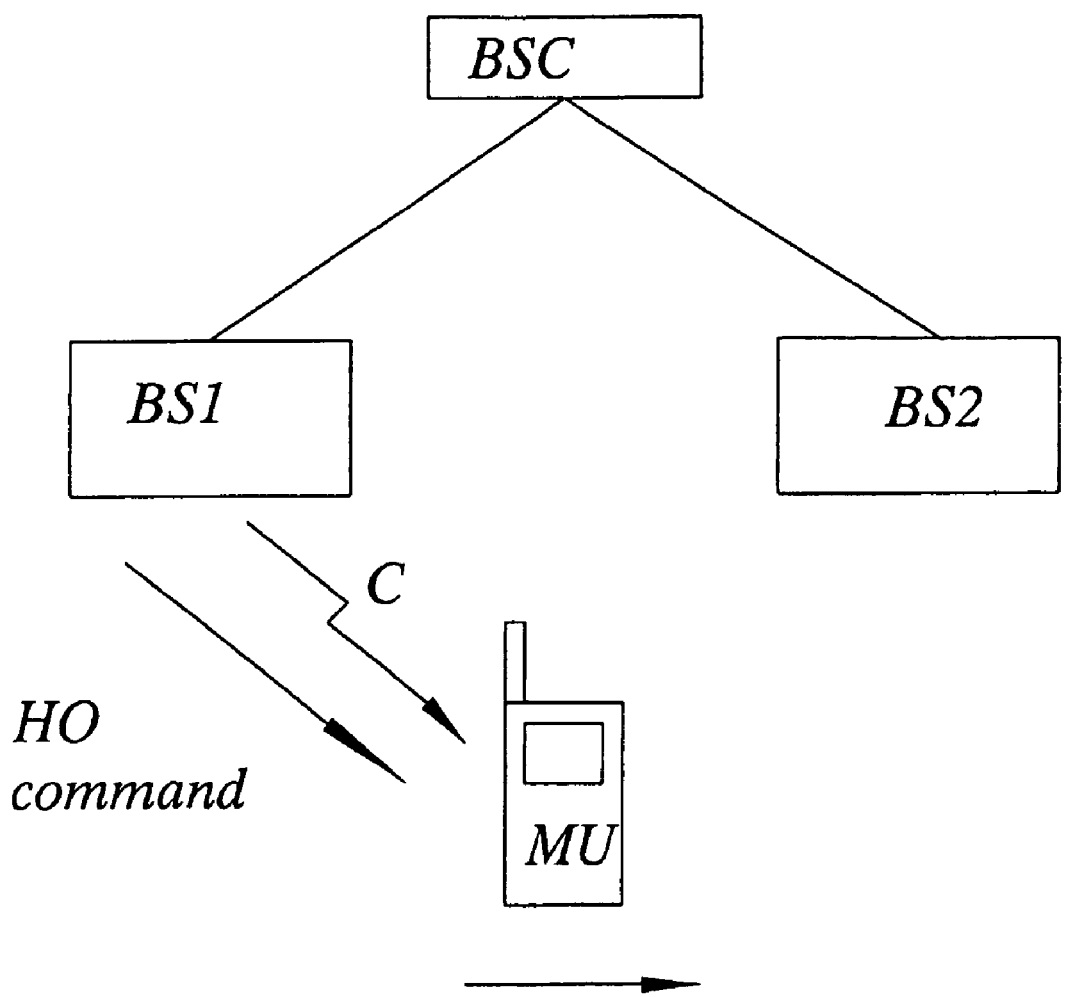

With reference to FIG. 5, the base station controller BSC issues a muting command to the interfering base station BS2. Preferably, the command comprises information regarding what frequency or set of frequencies to mute, and for what time slot the muting should be performed. In a coordinated fashion, the base station controller BSC issues the handover command to the first base station BS1. Meanwhile the mobile is moving further into the cell of the second base station, whereby the C/I decreases i.e. the interference I increases At a predetermined time slot, see FIG. 6, the handover command is transmitted to the mobile unit MU and at the same time, the interfering base station BS2 temporarily mutes itself based on the muting command from the base station controller.

Figure 7:
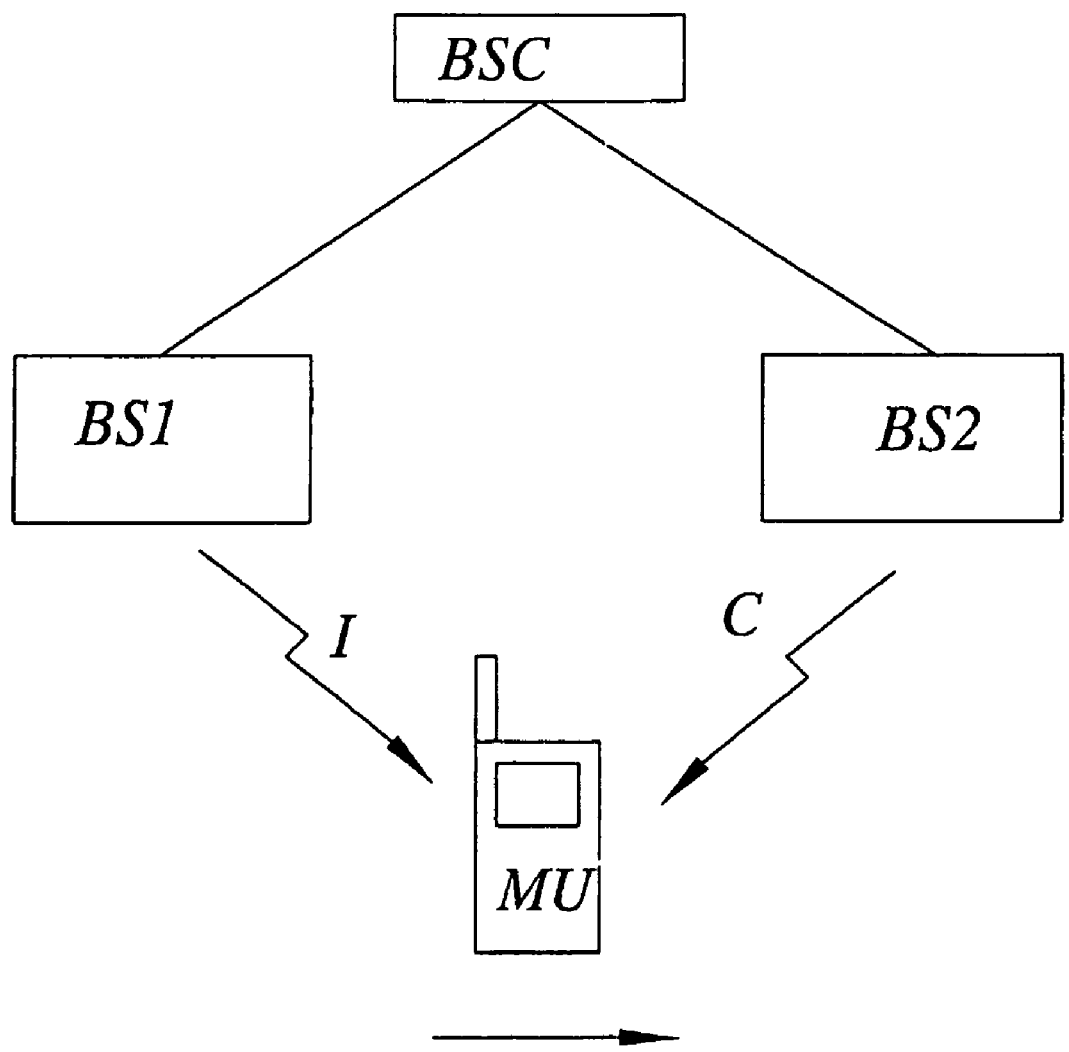

Finally, as shown in FIG. 7, the handover is completed and the previously interfering node has resumed transmission, now as a first communicating node and the previous first communication node is now a second interfering node.

In one example embodiment, transmission on the appropriate frequency, or frequencies in the case of frequency hopping, and time slot from the base station in cell B is simply muted at the time that the handover command is sent to the mobile from the base station in cell A, thereby increasing the C/I and the likelihood that the handover command is received correctly. In an alternative embodiment, the appropriate transmission from several interfering base stations could be muted in this manner.

Since there is a cost involved in temporarily muting transmissions, both in terms of lost bursts or frames for users in the muted cells, and in terms of control signaling in effecting the muting, an alternative cost-effective embodiment may be only muting transmission if certain predetermined criteria are fulfilled. One possibility would be to consider the measurement reports for the radio link to the serving cell, for example RXLEV and RXQUAL reports in GSM, and only apply the interference muting if the link quality to the serving base station is below some pre defined threshold. Another possibility would be to only perform muting if an initial handover attempt fails. Subsequent attempts are likely to take place in even tougher radio conditions due to continued mobility away from the serving base station making muting an even more appealing option. Combinations of these and other criteria for triggering cell muting are of course possible. Utilizing knowledge of mobile position and/or velocity would be one such alternative.

A general criterion for muting an interfering cell or node could be that the C/I experienced by a user about to perform handover falls below a predetermined threshold. Other exemplary criteria for muting an interfering cell or node could be that one of the bit error rate (BER), frame erasure rate (FER), or block error rate (BLER) exceeds a respective predetermined threshold value. Also, other criteria could be used.

The description so far has used handover command transmission on the serving cell downlink as an illustration, but the idea can readily be applied to other handover signaling, both on the uplink and downlink.

Figure 8:
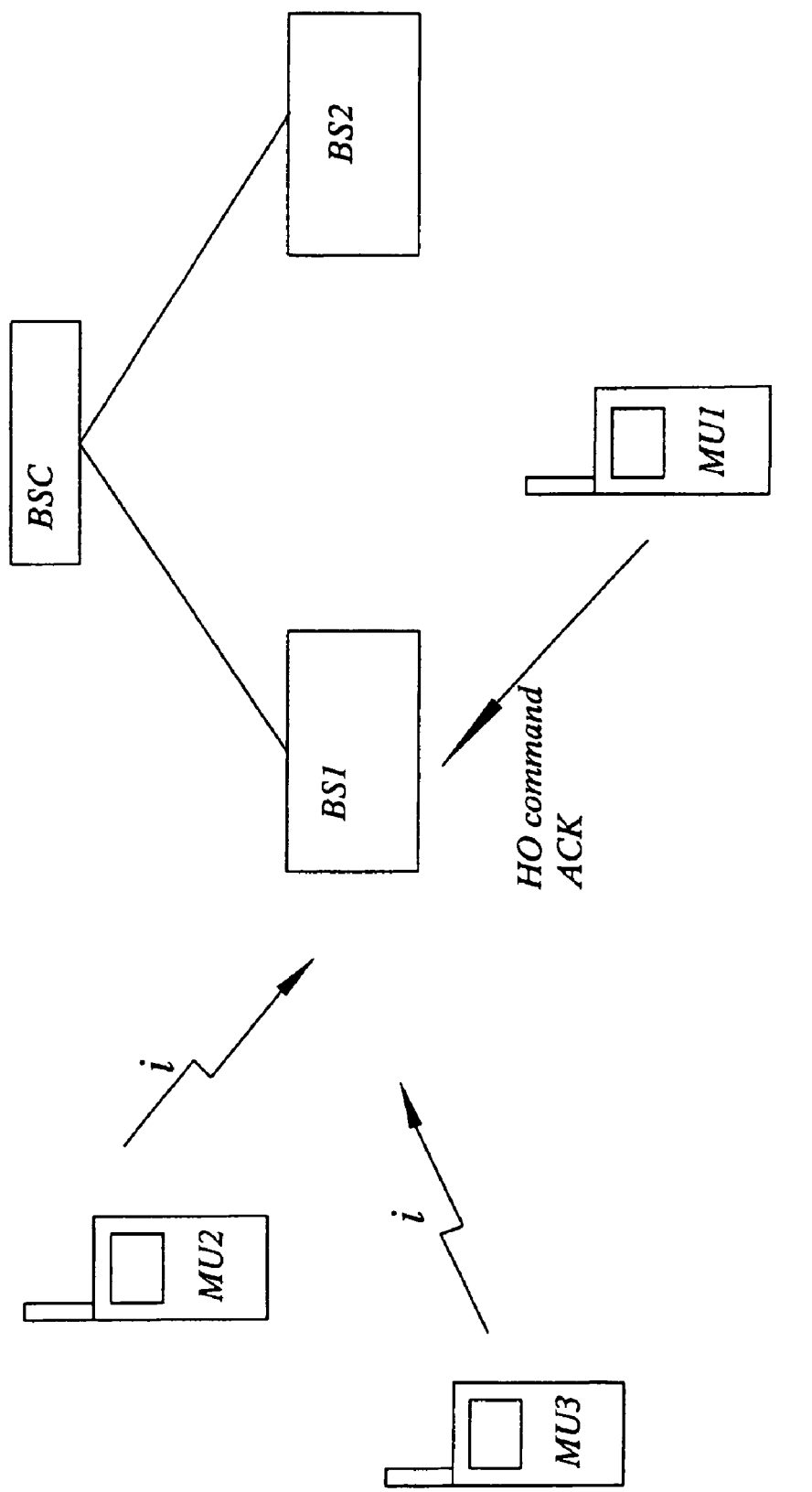
FIG. 8 illustrates a further example embodiment of a method.

An example of when uplink interference muting may be beneficial is in the case of handover command segmentation, as illustrated by the system in FIG. 8.

In this case, the user or mobile unit MU1 must acknowledge reception of a first segment of a handover command before a second segment can be transmitted from the first base station BS1. The handover command acknowledgement is sent to the serving base station BS1 on the uplink whose quality may be poor due to the mobile unit already having passed the nominal cell border.

For the specific case of a GSM system the handover command is a layer 3 or L3 message sent from the base station controller BSC to the serving base station BS1. The base station BS1 divides and provides the L3 message in one or several layer 2 or L2 segments. Each such segment is sent to the mobile unit MU1 one at a time, each transmission requiring a layer 2 acknowledgement or L2 ACK from the mobile unit MU1 before the next segment is transmitted from the serving base station BS1. This L2 ACK is critical since the mobile unit cannot do anything before the entire handover command is received. A more favorable uplink transmission environment may be required to achieve a successful handover in such a situation.

In this case the at least one second interfering node is not the second base station BS2, but instead other mobile units MU2, MU3 communicating with the first base station BS1. Consequently, it is one or several mobile units that need to be muted according to an example embodiment in order to enable reliable handover signaling in the system.

Cell muting on the uplink, as described above, requires a fast signaling capability in order to mute the appropriate interfering mobiles at the appropriate time.

Figure 9:
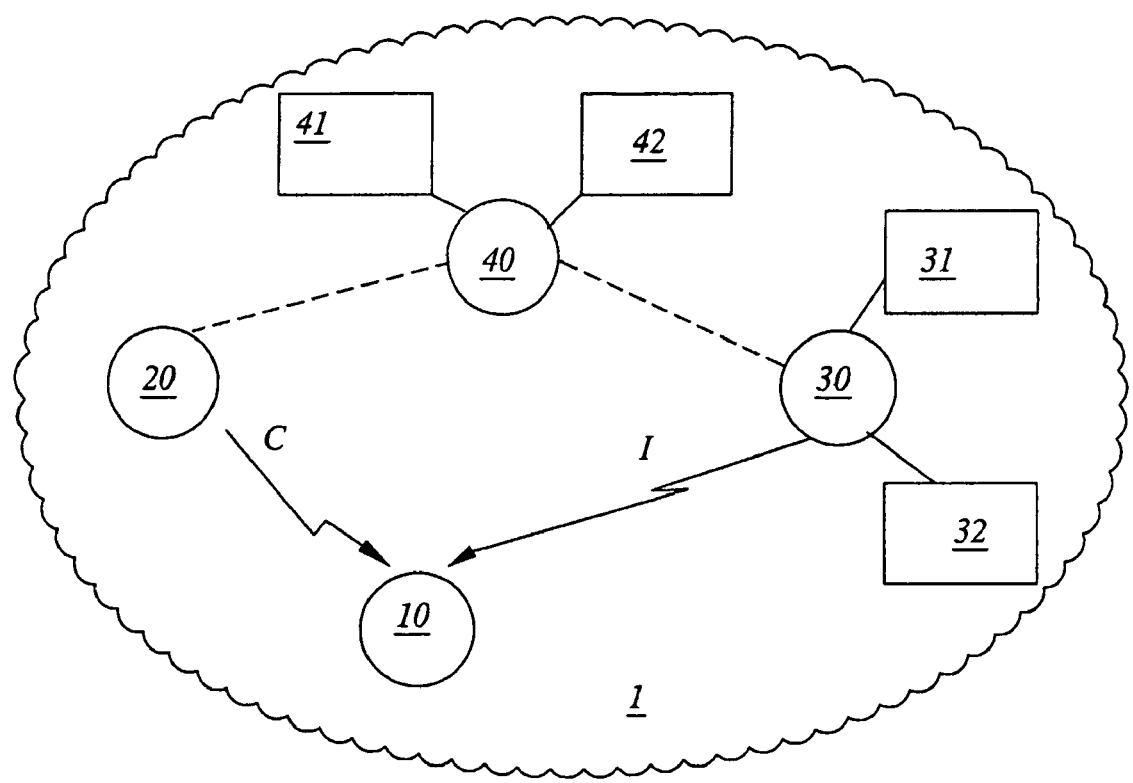
FIG. 9 illustrates an example embodiment of a system and arrangements.

With reference to FIG. 9, a system 1 comprises means 41 for issuing a muting command to a node 30 interfering with communication between a first node 20 and a user 10, means 42 for coordinating muting and handover signaling, and means 31 for receiving the muting command, and means 32 for muting the interfering node 30 based on the received muting command.

The system can, according to a further embodiment, comprise means for identifying which interfering node or nodes to mute.

With reference to FIG. 9, a control node 40 according to an example embodiment comprises the means 41 for issuing muting commands to interfering nodes and the means for coordinating 42 handover signaling with the muting commands.

With reference to FIG. 9, an interfering node 30 according to an example embodiment comprises the means 31 for receiving muting commands and the means 32 for muting in response to the received muting command. The node 30 can be either one of a base station interfering with transmissions to a mobile unit, or a mobile unit interfering with transmissions to a base station.

The arrangement and location of the different means of the embodiment in FIG. 9 serves only as illustration and should not be, viewed as limiting.

Figure 10:
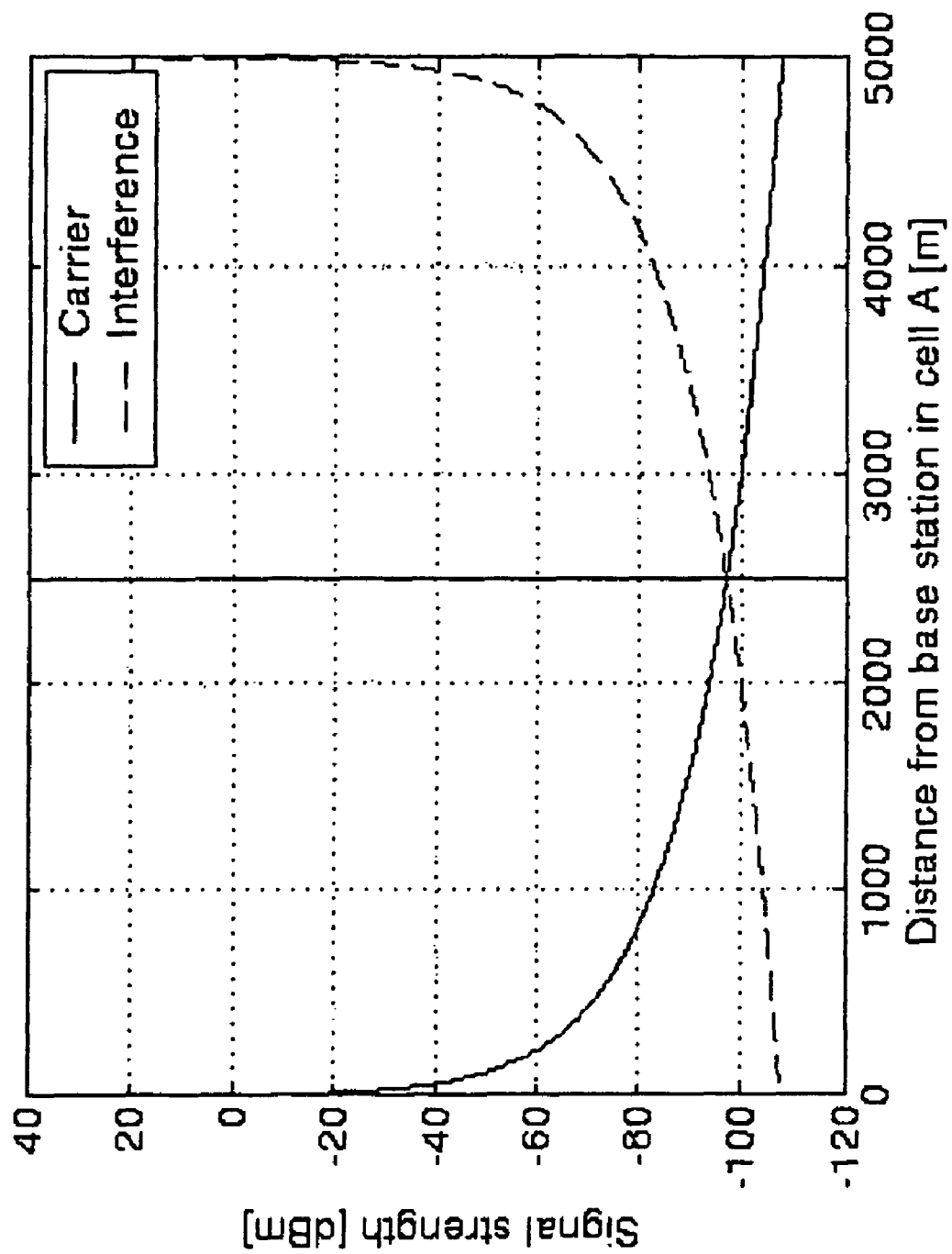
FIG. 10 is a diagram illustrating the relation between carrier and interference.

FIG. 10 illustrates an exemplary diagram of how the carrier strength C and the interference I vary with the distance from the respective base stations in cell A and cell B in FIG. 1. The distance between the base stations is assumed, for exemplary reasons, to be 5000 m and the nominal cell border is located at 2500 m where C/I=1. Okumura-Hata's propagation model [1] is used for calculating the diagram.

Figure 11:
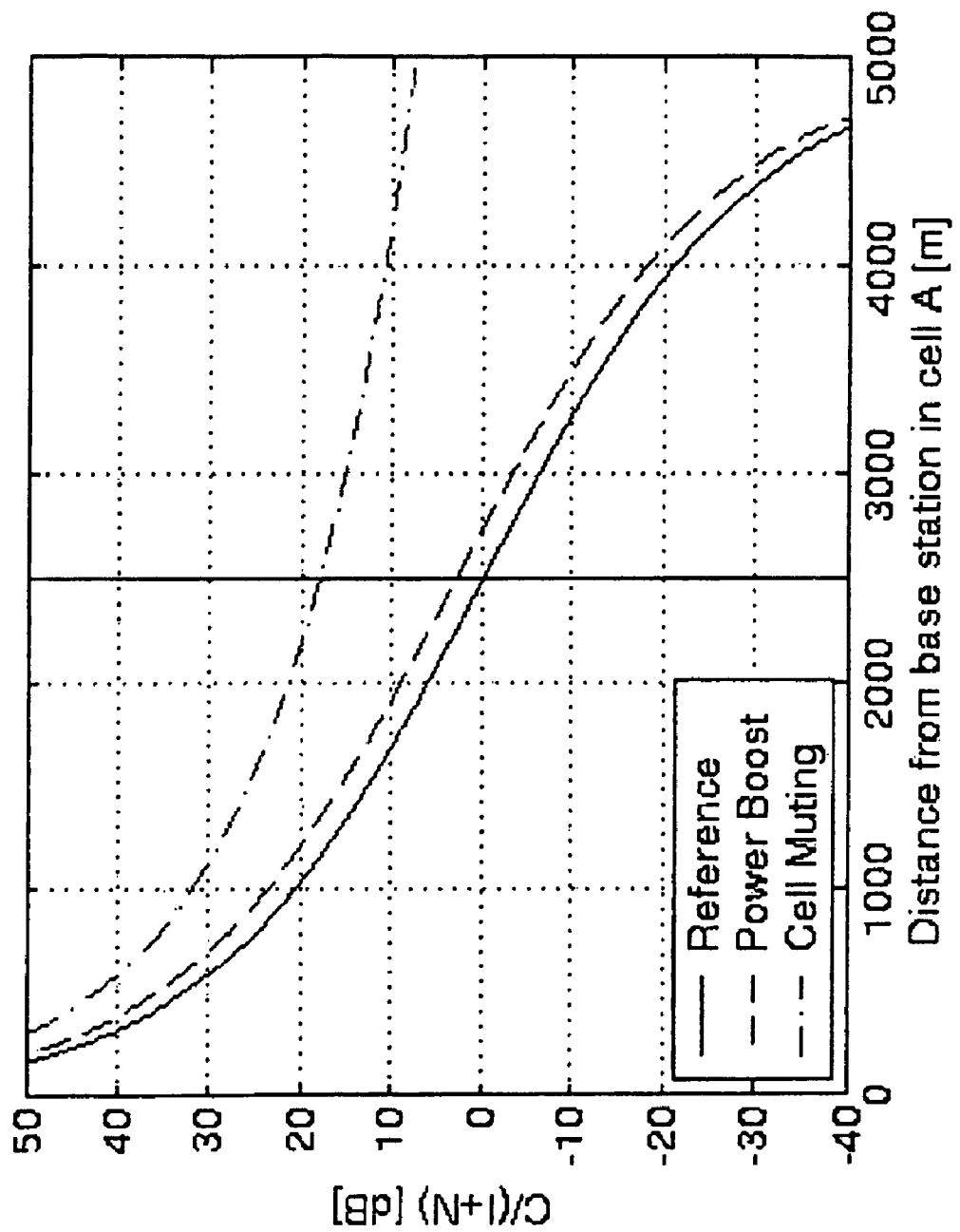
FIG. 11 is a diagram illustrating a comparison between prior art and the technology described herein.

FIG. 11 is a diagram illustrating a comparison between prior-art and the technology described herein. The diagram shows how C/(I+N) for a mobile station varies with the distance from the serving base station in cell A, where C=carrier strength, I=interference, and N=noise (−115 dBm for this case). The solid line represents the standard case with C and I according to FIG. 10. The dashed line represents the known prior-art technique of the base station in cell A (temporarily) increasing its power to improve C/I. The example illustrates a power increase or power boost of 3 dB. The dash-dotted line illustrates cell muting according to the technology described herein, where the base station in cell B is (temporarily) silent or muted. For a practical implementation, the applied muting would appear as a peak in the C/I curve in combination with receiving the handover command.

As is implied by FIG. 11 the effect of muting the interfering cell(s) is strong, which opens up the possibility of further reducing the risk of lost frames for mobile units utilizing the interfering cell. According to another embodiment, it is possible to only reduce the transmission power in the interfering cell(s) not completely mute it. Thereby, mobiles communicating with the base station will only experience a reduction in received power for the affected bursts or frames; consequently, the overall quality for the affected mobiles is increased compared to completely muting one or more bursts or frames.

Another useful implementation is for systems utilizing a so-called CHAT-configuration [2]. In a CHAT scenario, more transceivers than hopping frequencies are available in a cell and these transceivers are split into separate logical groups termed "channel tiers". Each channel tier has its own frequency hopping sequence so interference between the tiers is strong but sporadic, just as it is between cells in a standard FLP network. An intra-cell handover in such an environment, for example to switch from a half-rate speech channel to a full-rate speech channel due to mobility away from the base station, may be essential to maintain service quality. With strong interference transmitted from the other tier, it may be necessary to temporarily mute the interfering tier as radio conditions deteriorate for the user in order to complete the intra-cell handover successfully.

Although muting will typically lead to some lost bursts or frames, the overall impact on the network will be positive, particularly with an adaptive solution. More handovers will be successful earlier leading to reduced interference and fewer service interruptions, e.g. dropped calls. Moreover, since frames are typically stolen each time handover signaling is transmitted in any case, more robust handovers with cell muting are likely to decrease the total number of lost frames in the network. In many cases with frequency hopping or similar techniques, a lost burst is manageable with channel coding anyway and there will be no negative quality impact at all.

Unlike soft handover and other prior art techniques, cell muting makes the handover procedure more robust without spreading extra interference in the network. Moreover, with a downlink implementation, there is no terminal impact and the only extra information that needs to be distributed in the network is a trigger for muting and the radio resource allocation of the user involved in the handover process. Cell muting is readily applicable to both CS and PS traffic in the world's most widespread cellular technology, GSM, as well as to other systems such as those based on Orthogonal Frequency Division Multiplexing (OFDM). It is applicable to both inter-cell and intra-cell handovers on both the uplink and the downlink.

At the present time, handover performance is a major limiting factor for the quality and spectral efficiency of state-of-the-art GSM networks. By improving handover performance, the technology described herein comprises the following example advantages to GSM and other cellular systems:

A more robust handover procedure;
Increased number of early successful handovers;
Decreased number of lost frames;
Decreased interference;
Improved service quality;
Fewer service interruptions such as dropped calls;
Increased network capacity.

It will be understood by those skilled in the art that various modifications and changes may be made to the technology described herein without departure from the scope of the appended claims.

REFERENCES

[1] M. Hata, "Empirical Formula for Propagation Loss in Land Mobile Radio Services", IEEE Transactions on Vehicular Technology, vol. 29, pp. 317-325, August 1980.
[2] "Fractional reuse through channel allocation tiering", Patent application number: PCT/SE01/01299.

The invention claimed is:

1. A method for hard handover of a radio connection in a radio communication system, said system including a radio connection established between a user equipment and a single serving base station, the method comprising the steps of:
   determining a need for a hard handover of the radio connection where the single serving base station passes on the radio connection in its entirety to another serving base station,
   temporarily muting at least one node interfering with the radio connection, and
   coordinating the temporary muting of said interfering node with hard handover signaling between said user equipment and said single serving base station to temporarily reduce interference during at least part of the hard handover signaling to enable reliable transmission of the hard handover signaling.

2. The method according to claim 1, further comprising muting at least one interfering base station during transmission of a hard handover command from the single serving base station to the user equipment.

3. The method according to claim 1, further comprising muting at least one interfering mobile unit during transmission of a hard handover command acknowledgement from the user equipment to the single serving base station.

4. The method according to claim 1, further comprising muting at least one dominating interfering node.

5. The method according to claim 1, further comprising identifying said at least one interfering node.

6. The method according to claim 1, further comprising completely muting the at least one interfering node.

7. The method according to claim 1, further comprising partly muting the at least one interfering node.

8. The method according to claim 1, further comprising performing said muting step for all handovers.

9. The method according to claim 1, further comprising performing said muting step for hard handovers according to a predetermined criterion.

10. The method according to claim 9, further comprising performing said muting step based on one or more measurement reports for the radio connection between the user equipment and said single serving base station.

11. The method according to claim 9, further comprising muting said interfering node if the radio connection quality between said single serving base station and said user equipment is below a predetermined threshold.

12. The method according to claim 9, further comprising muting said interfering node if a previous hard handover signaling attempt has failed.

13. The method according to claim 9, further comprising muting said interfering node if a carrier to interference ratio (C/I) for the user equipment falls below a predetermined threshold.

14. The method according to claim 9, further comprising muting said interfering node if a bit error rate for the user equipment exceeds a predetermined threshold.

15. The method according to claim 9, further comprising muting said interfering node if a frame erasure rate for the user equipment exceeds a predetermined threshold.

16. The method according to claim 9, further comprising muting said interfering node if a block error rate for the user equipment exceeds a predetermined threshold.

17. The method according to claim 1, said muting step further comprising issuing a muting command to said interfering node; and said interfering node muting its transmission in response to receiving the muting command.

18. The method according to claim 17, further comprising issuing said muting command from a control node in the system.

19. The method according to claim 18, wherein said control node is a base station controller.

20. The method according to claim 17, wherein said muting command includes at least timing information to coordinate the muting with hard handover signaling, and frequency information to inform said interfering node which frequencies to mute.

21. The method according to claim 1, wherein said radio communication system includes a GSM network employing fractional load planning and 1-reuse.

22. The method according to claim 1, further comprising performing said muting and coordinating for one of inter-cell hard handover signaling and intra-cell hard handover signaling.

23. The method according to claim 1, further comprising performing said muting and said coordinating for one of packet switched or circuit switched traffic.

24. An apparatus for hard handover of a radio connection in a radio communication system between a user equipment and a single serving base station, comprising electronic circuitry configured to:
   determine a need for a hard handover of the radio connection where the single serving base station passes on the radio connection in its entirety to another serving base station;
   temporarily mute at least one interfering node interfering with the radio connection; and
   coordinate the temporary muting of said interfering node with hard handover signaling between said user equipment and said single serving base station to temporarily reduce the interference during at least part of the hard handover signaling to enable reliable transmission of the hard handover signaling.

25. The apparatus according to claim 24, wherein the electronic circuitry is configured to issue a muting command to said interfering node, receive said muting command and mute said interfering node in response to said muting command.

26. A node for hard handover of a radio connection in a radio communication system between a user equipment and a single serving base station to another base station, comprising electronic circuitry configured to temporarily mute a node interfering with the radio connection to temporarily reduce the interference during at least part of the hard handover enable reliable transmission of signaling for the hard handover.

27. The node according to claim 26, wherein the electronic circuitry is configured to receive a muting command and mute the interfering node based on the received muting command.

28. The node according to claim 26, wherein the apparatus is included in the user equipment or in a base station.

29. A control node for hard handover of a radio connection in a radio communication system between a user equipment and a single serving base station, comprising electronic circuitry configured to:
   determine a need for a hard handover of the radio connection where the single serving base station passes on the radio connection in its entirety to another serving base station;
   issue muting commands to at least one node interfering with the radio connection to temporarily mute said at least one interfering node; and coordinate said muting commands with hard handover signaling between said single serving base station and said user equipment to temporarily reduce the interference from the at least one interfering node to enable reliable hard handover signaling.

30. The control node according to claim 29, wherein said control node is a base station controller.

* * * * *

UNITED STATES PATENT AND TRADEMARK OFFICE
CERTIFICATE OF CORRECTION

| | | |
|---|---|---|
| PATENT NO. | : 7,925,264 B2 | Page 1 of 1 |
| APPLICATION NO. | : 11/795412 | |
| DATED | : April 12, 2011 | |
| INVENTOR(S) | : Craig | |

It is certified that error appears in the above-identified patent and that said Letters Patent is hereby corrected as shown below:

On the Title Page, in Field (56), under "OTHER PUBLICATIONS", in Column 2, Lines 3-5, delete "Malaysian Search................20060347." and insert the same as a new entry.

Signed and Sealed this
Eleventh Day of October, 2011

David J. Kappos
*Director of the United States Patent and Trademark Office*